Figure 1:

INVENTOR
GEORGE WILLIAM MARTIN, JR.

BY Frederick J. Butz

ATTORNEY

United States Patent Office 3,235,399
Patented Feb. 15, 1966

3,235,399
IRIDESCENT PLASTIC COATINGS
George W. Martin, Jr., Wallkill, N.Y., assignor to E. I. du Pont de Nemours and Company, Wilmington, Del., a corporation of Delaware
Filed Sept. 6, 1962, Ser. No. 221,856
6 Claims. (Cl. 117—76)

This invention relates to plastic coated substrates and laminates having an unusual multi-colored flecked or iridescent sparkling appearance. It in particular relates to vinyl chloride polymer coated fabrics having such appearance. It further relates to a process for making such coated substrates using certain surface-treated mica pigments.

In the past, repeated attempts have been made to utilize mica as a nacreous pigment in plastic films and coatings. Generally, the results have not been attractive because of the similarity of the refractive index of mica and most plastic materials. Recently, micas having special inorganic surface treatments have been developed which produce a significant and usable nacreous effect when used in plastics. These surface treatments involve the application in a certain manner of translucent layers of inorganic material, specifically metal oxides or carbon particles, to mica flake, and the preparation of such micas and use in plastics are discussed in detail in the following U.S. Patents: 3,087,827, 3,107,173, 3,087,828, 3,087,829.

The mica pigments described therein provide for the first time in plastic coatings not only an excellent nacreous appearance, but in addition an unusually, high attractive and useful, multi-colored sparkle or flecked iridescent sparkling appearance quite different from the nacreous effect.

However, in film and coatings of vinyl chloride polymers this latter desired, iridescent sparkle surprisingly has so far either failed to be produced by these mica pigments or is present only to such a low degree as to not be of significant aesthetic value. Only the anticipated nacreous appearance is evident. Prior art films, for example, of calendered or solution coated vinyl chloride polymer compositions containing the usual 5 to 25% pigment content present a fine nacreous appearance, but do not display the required multi-colored or iridescent sparkle.

It is an object of this invention to provide vinyl chloride polymer coatings and laminates, hereinafter termed structures, containing said treated mica pigments in a manner to induce the desirable iridescent sparkle.

It has been found that these objects can be met by a coating having a combination of structural factors, namely: a unitized, substantially clear, vinyl chloride polymer plastisol or dispersion coating containing between about 0.1% and 1.5% by weight on the coating solids, of said treated mica pigment, the unitized coating being at least about 0.7 mil thick and in adherent contact with a smooth vinyl chloride polymer coated substrate, said substrate having a non-directional reflectance value of about 20% or less. In such a construction as this, each individual mica particle surprisingly becomes apparent and assumes a brilliant and different color visible only from a viewing angle which is specific to that particle, and showing flecks of red, blue, green, yellow and violet, etc. The over-all effect is the desired multi-colored sparkle and is most apparent over a black substrate. It is especially heightened when viewed by direct sunlight or a beam of high intensity light. Such coatings are highly attractive and useful in the manufacture of shoes, pocketbooks, cases, handbags, tiles, upholstery, wall and floor coverings, garnish trim for automobile interiors, rigid thermoset plastic panels and similar plastic laminates.

The multi-colored sparkle is believed to develop as the result of the above combined factors which are discussed in further detail herebelow:

(a) A unitized, substantially clear, (except for the presence of the treated mica) vinyl chloride polymer layer at least about 0.7 mil thick is essential. Unitized in this specification is used in the sense that the coating, at least 0.7 mil thick, is produced in a single wet or fluid coating operation in contrast to one requiring several coats with drying or solidifying steps between. Thinner coatings (less than 0.7 mil) are believed to induce an undesired leafing, i.e., orienting of the flakes parallel to the plane of the coating. However, there appears no important upper limit on film thickness and up to 10 or 20 mils can be used. The preferred range for vinyl chloride polymer coated substrates is from 0.7 to about 3.5 mils.

(b) Combined with the necessity of a unitized clear layer is the range of concentration of the treated mica pigment. Where less than about 0.1% by weight of the pigment on the coating is used, too little is present to be visually effective. On the other hand, more than 1.5% begins to introduce so much pigment even in plastisols that true hiding of the substrate becomes apparent and only the usual anticipated nacreous character is produced. The preferred region for the maximum multi-colored sparkle effect is about 0.5% to 1.0% by weight. The preferred treated mica pigment has a substantially transparent inorganic iridescent producing surface layer of materials such as metal oxides or carbon and particularly preferred are layers of such materials having an index of refraction above about 1.8.

Uniquely and surprisingly, unitized films of a given thickness have less hiding for a given concentration of pigment particles per square inch than do thinner non-unitized films—other factors being equal. Thus, it is the combined concentration/thickness factors used which have been discovered to produce with this class of pigments the unusual multi-colored sparkle appearance.

It is pertinent to understand the combined influence of these factors that thin coatings (less than about 0.7 mil) with 0.5% to 1.0% pigment, based on the weight of the coating, over even a black substrate show merely a diluted nacreous appearance and not the appearance shown by the products of this invention.

(c) The dark, 20%-or-less non-directional reflectance substrate is preferably smooth to provide uniform reflectance of light and enhance the appearance of the mica flakes. Finely embossed or grained effects can be tolerated at some loss of the sparkling quality. The substrate is of substantially a dark color to provide a desirable contrast to the light color of the mica flakes. Dark substrates having no more than about 20% reflectance values are preferred, with those below about 12% being particularly preferred. Such value factors as reflectance, whiteness or G-values as is well known in the art, can be determined on an non-directional reflectometer such as the "Colormaster" Colorimeter Model 4 (produced by E. I. du Pont de Nemours & Company). Substrates can be red, blue, green, brown, gray, violet, black or other colors that provide below about 20% reflectance value. Dark grays, blues and blacks are particularly preferred colors, e.g., commonly referred to as charcoal gray or navy blue having reflectance values in the range of 3% to 8%, and blacks having values running on down to 1% or less reflectance. Substrates of more than 20% reflectance tend to obscure the sparkling quality of the coatings of this invention and are less desirable.

(d) Finally, the particle size of the treated mica, as noted before, is a factor. Being flakes, they are much larger in two dimensions than they are in the third. They should be at least about 5 to 10 microns in the two major dimensions and in the range of 0.5 to 5.0 micron in thickness. For most pigment purposes, the upper limit in the major dimension is about 150 to 200 microns, though with appropriate mixing and coating procedures, larger particles can be accommodated for special effects. Particles less than about 5 microns in major dimensions are less capable of producing the unusual effect of the products of this invention. The preferred particle size range is from 50 to 125 microns.

Figure 2:
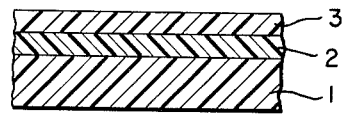
Figure 3:
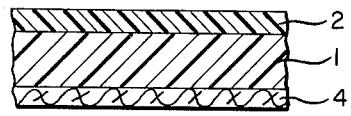

The structures of the invention are illustrated in the drawings, which show side elevations of various embodiments. FIG. 1 illustrates the simplest form, in which the smooth substrate having a non-directional light reflectance of less than about 20% (1) is covered with the substantially clear unitized layer (2). FIG. 2 illustrates the structure of FIG. 1 having an optional clear topcoat (3). FIG. 3 shows the structure of FIG. 1 having an optional fabric base (4).

The coatings of this invention can be made in a number of ways. First, the clear fluid vinyl chloride polymer composition is prepared by gently stirring in the mica flake, preferably without substantial particle size reduction. Plastisols are preferred compositions, though aqueous or organic dispersions or hot melts that avoid leafing of the mica pigment can also be used. Small amounts of other materials, dyes, stabilizers, pigments can also be incorporated. These compositions are coated on the dark smooth substrate by spraying, knife or roll coating, dip coating, extrusion or even brushing, providing a substantially random orientation of the mica flake results. They are then dried and fused.

Preferably, the plastisol coatings are applied by use of an engraved inking or pad roll in combination with a knife or sequeegee to remove the excess coating from the roll surface. The depth and the style of the engraving can be varied to adjust the thickness of the applied coating as is well known in the art. Alternatively, the fluid compositions can be converted to unsupported films by casting on a roll or a carrier belt followed by fusing stripping. The free films then can be laminated in turn to the dark colored substrate by any of several means well known in the art.

The dark colored substrate can be any of a wide variety of materials, including plastic coated fabrics (woven, non-woven and knit), paper, leather, wood, metal, ceramics on resin impregnated papers, and glass mats.

The vinyl chloride polymer compositions of this invention are intended to include polyvinyl chloride homopolymer as well as copolymers with other ethylenic monomers, such as acrylate esters, vinyl acetate and similar esters, maleic anhydride and acrylonitrile.

The following examples illustrate this invention:

*Example I*

A smooth, polished, black, polyvinyl chloride (PVC1) plastisol coated fabric is prepared by knife coating Composition A shown below in the amount of about 28 oz. per sq. yd. on a black dyed cotton sateen. The coating is then fused for about 25 seconds at 400° F. and smooth-roll polished by pressing the hot coating against a chilled polish roll.

Composition A: Parts by weight
PVC1 plastisol resin _____ 49.26
Dioctyl phthalate _____ 29.66
20% carbon black dispersion in dioctyl phthalate _____ 3.31
Barytes _____ 17.77

A treated mica topcoat Composition B is then prepared and applied to this base by the following procedure:

In a separate mixer the following ingredients in parts by weight are blended:

Composition B: Parts by weight
PVC1 resin "Marvinol" VR–50 (U.S. Rubber Company) _____ 57.10
Plasticizer "Paraplex" G–62 (Rohm & Hass Co.) _____ 2.55
Stabilizer "Mark" M/PL (Argus Co.) _____ 1.65
Dioctyl phthalate _____ 28.69
Polyethylene glycol monooleate _____ 0.13

When this is smooth, 2.69 parts of diisobutyl ketone are added and then the viscosity of the mix is adjusted to the range of 10–20 Stormer second/100 revolutions (1000 gm. wt.) (Stormer Type A viscosimeter) by adding about 7.19 parts of a high boiling odorless kerosene. When this mix is smooth, about 1 part of a translucent metal oxide treated mica pigment as hereinbefore described is slowly stirred in until uniformly dispersed. The mix is then vacuum deaerated to remove entrained air bubbles.

The above prepared Composition B is then applied to the black pastisol coated fabric to a thickness of about 1 mil by using a knife-over-engraved steel pad roll coating machine to gain maximum smoothness of application. The coating is then dried about 5 minutes in a convection oven at 275° F. and fused for 30 seconds at about 400° F. While the coating is still plastic, it is laminated to a cellophane film of about 2 mil thickness and passed in pressing contact with a smooth chilled roll as described in U.S. 2,801,949 to Bateman.

When the cellophane is stripped and the chilled film is exposed to bright sunlight, an unusual, iridescent sparkle effect is obtained, displaying within the coating brilliant flecks of red, blue, green, yellow and violet varying rapidly with the change in angle of viewing.

In contrast, a similar coating in which Composition B is replaced by a solution of a plasticized vinyl resin containing 1% by weight on the dry solids of the mica pigment over the black base and coated 0.3 mil thick results in a product having a dull, flatted, somewhat narcreous appearance, but displaying substantially no multi-colored sparkle.

*Example II*

Example I is a repeated in which Composition B contains in addition 2 parts by weight of Composition C.

Composition C: Parts by weight
Copper phthalocyanine blue pigment _____ 40
Dioctyl phthalate _____ 60
___
100

The same brilliant colored sparkle effect is obtained, suffused with a blue tint.

Other variations of Composition C useful in this invention are obtained by replacing the phthalocyanine blue by a phthalocyanine green, a pigment scarlet or a vat yellow pigment. Opaque pigments, such as chrome yellow, carbon black or manganese phosphate can also be used but with less spectcular appearance.

*Example III*

Example I is repeated, using a deep red vinyl chloride plastisol coated non-woven fabric of 12% reflectance to replace the black base coating. The same iridescent effects are obtained, having a red rather than black hued background.

Example IV

Example I is repeated and the product is then overcoated by applying about a 0.3 mil thick coating (dry basis) of solution Composition D prepared as follows:

Part I:

| | |
|---|---|
| PVC1 resin "Geon" 202 (B. F. Goodrich Co.) | 10.13 |
| Polymethyl methacrylate "Lucite" 41 (E. I. du Pont de Nemours & Co.) | 3.37 |
| Polyvinyl chloride terpolymer VAGH (Carbide & Carbon Corp.) | 1.50 |
| Methyl ethyl ketone | 85.00 |
| | 100.00 |

The resins in Part I are placed in the solvent in a kettle fitted for reflux and then heated gently to reflux and stirred until dissolved. The product is then strained to remove any undissolved particles and cooled.

A dispersion of a copper phthalocyanine blue pigment is then separately prepared by stirring and dissolving chips (of 50 parts of pigment separately 2-roll mill dispersed in 40 parts of vinyl chloride copolymer VYHH (Carbide & Carbon Corporation) and 10 parts of dioctyl phthalate) as follows:

Part II:

| | |
|---|---|
| Chips | 25.00 |
| Methyl ethyl ketone | 73.00 |
| Polymethyl methacrylate "Lucite" 41 | 2.00 |
| | 100.00 |

From the above 98 parts of Part I are blended with two parts of Part II until a smooth mix is obtained. This is designated as Composition D.

Composition D is then roller coated over the Composition B coated and fused material of Example I and dried in a convection oven at 200°–220° F. at about 5 yards per minute. It is then smooth-pressed, as before indicated, by laminating and pressing with about a 2 mil thick cellophane film and a chilled smooth cylinder.

The product shows the brilliant flecked iridescent sparkle of Example I, suffused by a highly attractive bluish hue.

Example V

Example IV is repeated in which the copper phthalocyanine blue chip is replaced by an analogous chip of copper phthalocyanine green, pigment scarlet or a vat yellow transparent organic pigment. Analogous sparkling structures result, having respectively greenish, reddish or yellowish hues.

Example VI

Composition B of Example I is prepared and coated and fused to a 5 mil film on a polished steel belt. After cooling, the film is then laminated in a press at about 275°–325° F. for 3 minutes to a clean piece of black rigid polyvinyl chloride sheeting. After cooling, a laminate structure having substantially similar sparkling appearance to the product of Example I results.

Example VII

An organasol of about 65% solids (polyvinyl chloride polymer dispersed in a mixture of hydrocarbon and ketone solvents and ester plasticizer is prepared containing about 0.7% by weight of the treated mica of Example I. This dispersion is then knife coated 2.2 mils thick on the coated substrate of Example I, dried at 225° F. in a convection oven and then fused for about two minutes a 375° F. A multi-colored sparkling coating over a black substrate results.

Example VIII

A coating is prepared with a plasticized aqueous vinyl chloride copolymer 55% dispersion ("Geon" 576) and 0.5% to 1.5% translucent metal oxide treated mica pigment. The composition is coated 3 mils thick on an acrylonitrile/butadiene impregnated nylon non-woven fabric previously coated, dried and smooth-pressed with a dark blue vinyl chloride polymer solution (having a dry film reflectance of 8% and weight of 2.0 ounce per yard). The aqueous dispersion coating is then dried in a convection oven at 225° F. for 25 minutes and smooth-pressed hot against a chilled polish roll. This coating is then further top-coated 0.5 mil thick with Composition D as shown in Example IV. A brilliant, sparkling coating over a blue background results.

I claim:

1. A multi-colored sparkling plastic structure comprising at least one substantially clear, unitized, vinyl chloride polymer layer at least about 0.7 mil thick containing about from 0.1 to 1.5% by weight of a mica flake pigment surface-treated with a translucent, inorganic, iridescence producing layer, said unitized polymer layer being in adherent contact with a substantially smooth, vinyl chloride polymer substrate, said substrate having a non-directional light reflectance value of less than about 20%.

2. The structure of claim 1 which comprises in addition a third layer of a substantially clear plastic composition topcoat superposed upon and in adherent contact with the surface-treated mica-containing layer.

3. A structure of claim 1 in which the unitized polymer layer containing the treated mica flake pigment is a plasticized vinyl chloride homopolymer.

4. A structure of claim 3 in which the substrate is a plasticized vinyl chloride resin coated fabric.

5. A process for preparing a multi-colored sparkling plastic structure, said process comprising:
   (a) preparing a fluid vinyl chloride polymer dispersion containing between about 0.1 and 1.5% by weight, based on the dispersion solids, of mica flake surface-treated with a translucent inorganic layer;
   (b) coating said fluid dispersion on a smooth vinyl chloride polymer coated substrate to a thickness greater than about 0.7 mil, said substrate having a non-directional light reflectance value of less than about 20%; and then
   (c) converting said fluid dispersion coated substrate to a solid plastic laminate structure.

6. The process of claim 5 in which the fluid vinyl chloride polymer in (a) is in the form of a plastisol.

References Cited by the Examiner

UNITED STATES PATENTS

| 1,883,412 | 10/1932 | Schneider | 117—159 |
| 2,575,046 | 11/1951 | Chavannes et al. | |
| 3,087,828 | 4/1963 | Linton | 117—159 X |

RICHARD D. NEVIUS, *Primary Examiner.*

WILLIAM D. MARTIN, *Examiner.*